United States Patent [19]

Srinivasan

[11] Patent Number: 5,699,505

[45] Date of Patent: Dec. 16, 1997

[54] METHOD AND SYSTEM FOR AUTOMATICALLY COLLECTING DIAGNOSTIC INFORMATION FROM A COMPUTER SYSTEM

[75] Inventor: Usha Srinivasan, Wayne, Pa.

[73] Assignee: Unisys Corporation, Blue Bell, Pa.

[21] Appl. No.: 700,134

[22] Filed: Aug. 20, 1996

Related U.S. Application Data

[63] Continuation of Ser. No. 287,398, Aug. 8, 1994, abandoned.

[51] Int. Cl.$^6$ .................................................. G06F 11/00
[52] U.S. Cl. .................... 395/183.07; 395/183.1; 395/182.08; 395/182.21; 364/230
[58] Field of Search .............................. 395/575, 375, 395/183.01, 183.03, 183.07, 183.06, 183.13, 182.08, 182.09, 182.21, 182.22, 183.09, 183.1, 183.16, 182.1, 185.01; 371/16.1, 15.1, 16.4; 364/229, 229.2, 230, 260, 260.6

[56] References Cited

U.S. PATENT DOCUMENTS

| | | | |
|---|---|---|---|
| 4,236,246 | 11/1980 | Skilling | 395/575 |
| 4,519,025 | 5/1985 | Fayette | 395/575 |
| 4,851,985 | 7/1989 | Burrar et al. | 395/184.01 |
| 4,912,711 | 3/1990 | Shiramizu | 395/183.01 |
| 5,005,172 | 4/1991 | Kawamoto | 395/183.07 |
| 5,056,091 | 10/1991 | Hunt | 395/182.08 |
| 5,062,055 | 10/1991 | Chinnaswamy et al. | 364/200 |
| 5,084,875 | 1/1992 | Weinberger et al. | 395/575 |
| 5,379,406 | 1/1995 | Wade | 395/500 |
| 5,423,050 | 6/1995 | Taylor et al. | 395/183.07 |

*Primary Examiner*—Robert W. Beausoliel, Jr.
*Assistant Examiner*—Trinh L. Tu
*Attorney, Agent, or Firm*—John B. Sowell, Esq.; Mark T. Starr, Esq.; John F. O'Rourke, Esq.

[57] ABSTRACT

A method is provided for collecting information located within a plurality of hardware elements of a computer system. The hardware elements of the plurality of hardware elements are simultaneously instructed to collect the information. The information within the instructed hardware elements is simultaneously collected. A maintenance system is provided for monitoring the computer system and determining a computer system error in accordance with the monitoring. The step of simultaneously instructing the hardware elements to collect the information is performed in accordance with a computer error determined in this manner. The hardware elements, which may be hardware processors, are provided with individual hardware modules which receive the simultaneous instructions to collect data and direct the simultaneous collection of information within the hardware elements. A transmission link is coupled to each hardware element in the computer system for transmitting the collected information.

9 Claims, 4 Drawing Sheets

METHOD AND SYSTEM FOR AUTOMATICALLY COLLECTING DIAGNOSTIC INFORMATION FROM A COMPUTER SYSTEM

This application is a continuation of application(s) Ser. No. 08/287,398 filed on Aug. 8, 1994, now abandoned.

BACKGROUND OF THE INVENTION

The present invention relates generally to management of a large computer system and, more particularly, to performing diagnostics when a system failure has occurred in a large computer system.

In the prior art it is known to provide maintenance software for maintaining and managing the operation of large computer systems (typically mid-sized to larger computer systems) which may include a number of different hardware elements such as a plurality of separate hardware elements. This type of maintenance software may run on a stand alone personal computer which may be coupled to the various hardware elements within the large computer system maintained by the maintenance software. When the maintenance software detects a problem with the large computer system it attempts to correct the problem and restore the large computer to its normal state.

When an element within a large computer system has one of a predetermined set of errors the maintenance software may cause the system to stop running in order to correct the problem. When this occurs the maintenance software determines the state of all of the elements in the large computer system and saves the state information for diagnostic purposes. The collection of this data is referred to as state dump because the collected data is used to describe the state of the system at the time the large system was brought down by the maintenance hardware.

Thus this state dump is sometimes referred to as a snapshot of the large computer system at the time it was brought down. As much information as possible is usually collected during this state dump in order to better understand the problem. Typically, during this diagnostic information collecting process anywhere from one hundred kilobytes to two megabytes of diagnostic information may be collected from the various hardware elements in order to get the snapshot of the problem that occurred. It is crucial that this information collection phase be as quick as possible and that the computer system be brought back up as soon as possible.

Referring to FIG. 1, there is shown a flow diagram of a prior art serial state dump collection system 10 for collecting diagnostic information from $\underline{n}$ differing hardware elements within a large computer system. The $\underline{n}$ differing hardware elements within the computer system may be separate hardware elements. In performing the data collection of the serial state dump collection system 10, an index $\underline{i}$ is initially set to zero as shown in block 12 and the maintenance software sends a dump state request to a first hardware element, hardware element zero, as shown in block 14. This request instructs hardware element zero to begin collecting its diagnostic dump information.

The serial state dump collection system 10 then waits a period of time for the state dump information which resides within hardware element zero to be available as shown in block 16. During this wait period no further processing of dump information is performed by the serial state dump collection system 10 which is therefore idle. When the dump data is received by the serial state dump collection system 10 from the hardware element zero it is written to a storage disc 20 as shown in block 18. The write to the disk 20 is performed without any further processing of the dump information by the hardware element zero or the serial collection system 10.

After the write of dump information to the storage disc 20 the index $\underline{i}$ is incremented as shown in block 22. A determination is then made in decision block 24 whether the state information of all $\underline{n}$ hardware elements has been dumped. When the state information for all $\underline{n}$ hardware elements has been dumped the serial state dump collection system 10 is done as shown at terminal 28.

If the state information of all $\underline{n}$ hardware elements has not been dumped execution of the serial state dump collection system 10 proceeds back to block 14 where a dump is requested from the next hardware element, whereupon the next hardware element begins collecting its dump information. Until this time the next hardware element is idle. Thus using the state dump collection system 10 it will be noted that the various hardware elements in the large computer system collect and dump their state information in series. Only when one hardware element is done dumping its state information does the next one begin.

A typical serial dump performed in this manner by a single hardware element may take from ten seconds to two minutes based upon the particular hardware configuration. The amount of time required to gather all of this state dump information is critical because the large computer system is down during the entire time. The faster the state dump information is gathered the faster the computer system may be brought back on line.

SUMMARY OF THE INVENTION

The invention is a method for parallel collection of diagnostic information located within a plurality of hardware elements of a computer system. All of the hardware elements of the plurality of hardware elements are simultaneously instructed by the maintenance system to collect their respective diagnostic information. The diagnostic information within the instructed hardware elements is then simultaneously collected. The maintenance system which monitors the computer system determines a computer system error in accordance with the monitoring and the step of simultaneously instructing the hardware elements to collect the information is performed according to the computer error determined in this manner. The hardware elements, which may be hardware processors, are provided with individual hardware modules which receive the simultaneous instructions to collect data and direct the simultaneous collection of information within the hardware elements. A transmission link is coupled to each hardware element in the computer system for transmitting the collected information to the maintenance system.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that this invention is not limited to the precise arrangements and instrumentalities shown. In the drawings.

DETAILED DESCRIPTION OF PREFERRED EMBODIMENTS

Figure 1:
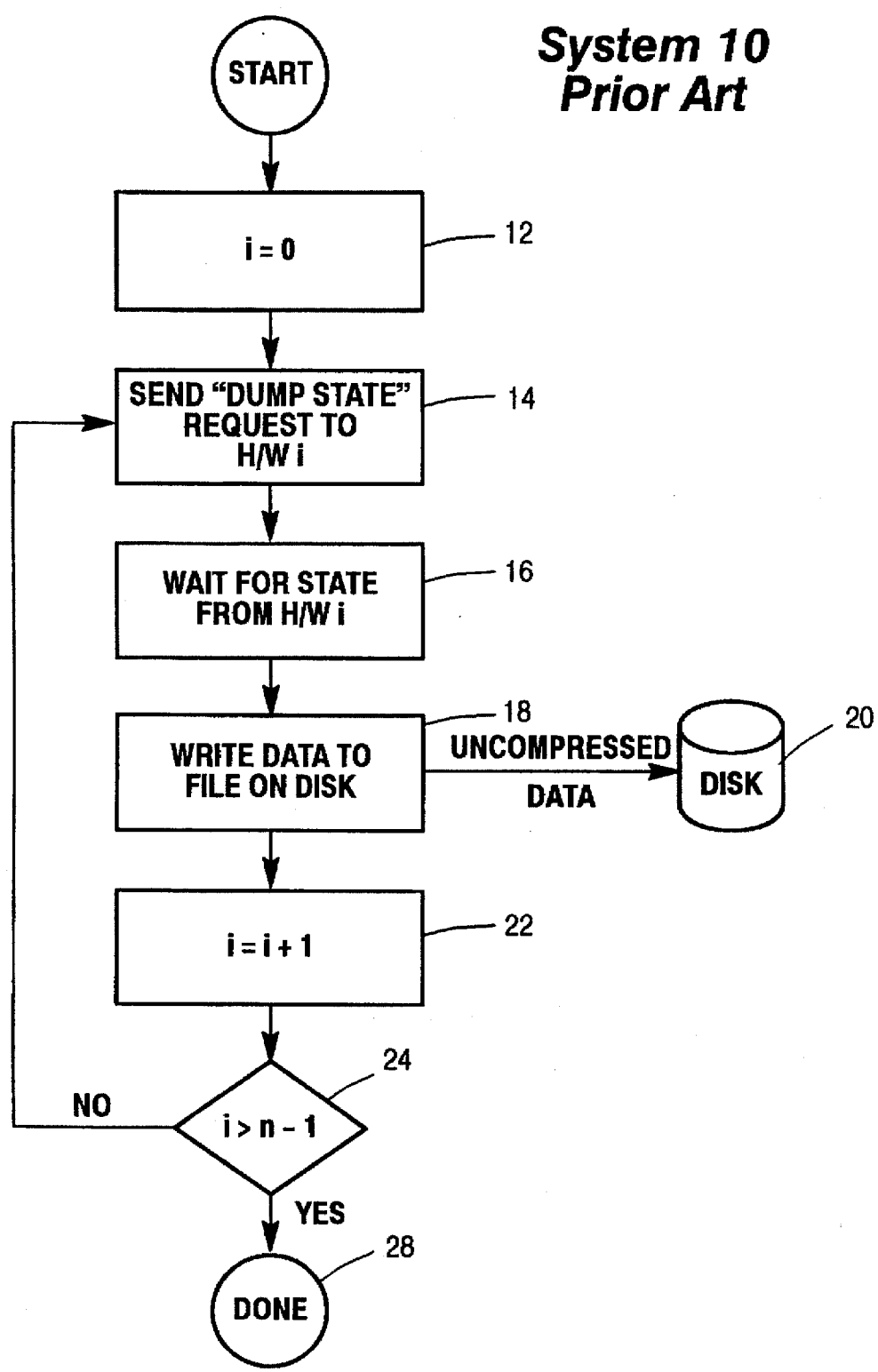
FIG. 1 is a flow chart representation of a prior art system for the serial collection of diagnostic state dump information in a conventional large computer system.
Figure 2:
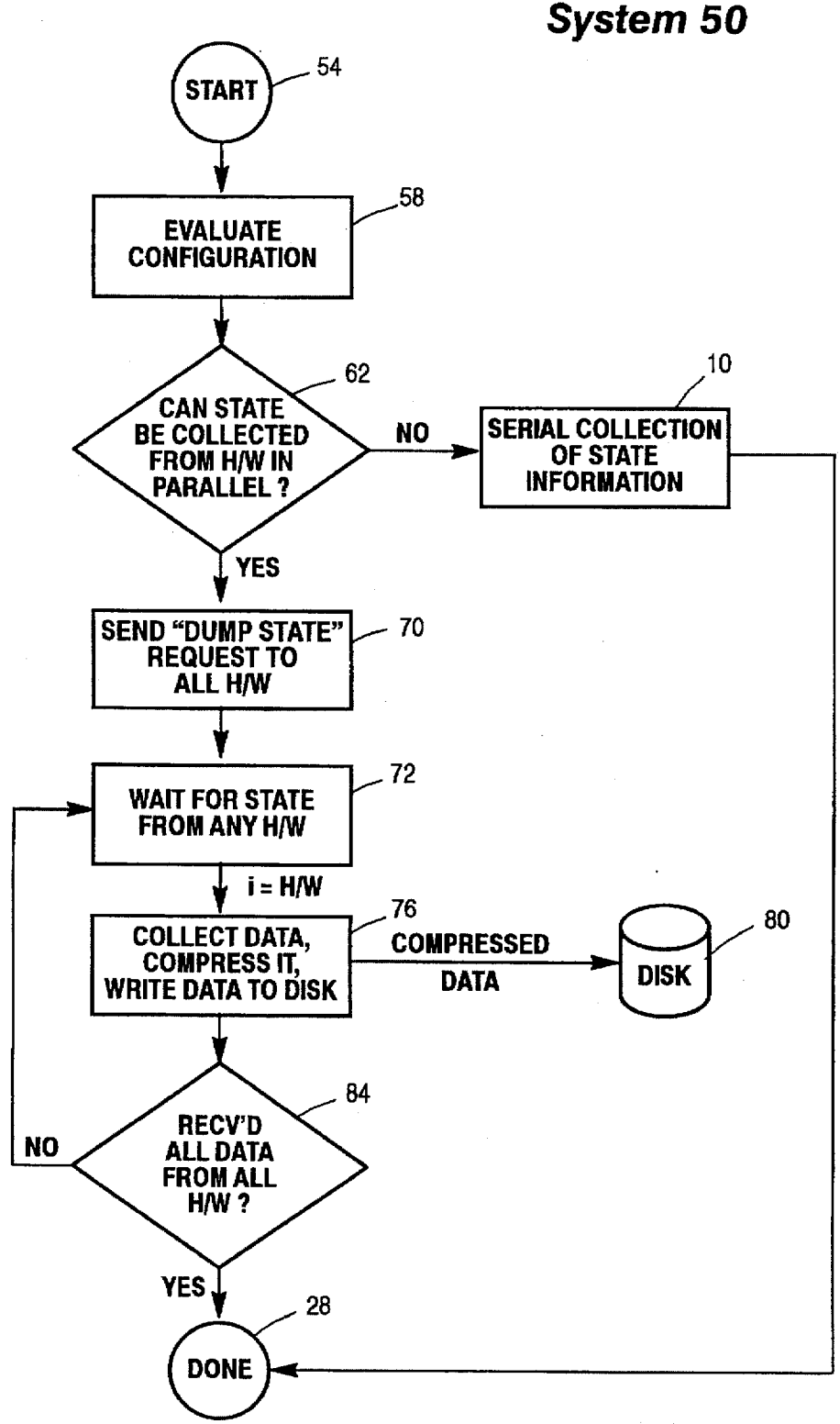
FIG. 2 is a flow chart representation of a preferred embodiment of a system for parallel collection of diagnostic state dump information in a large computer system in accordance with the present invention.
Figure 3:
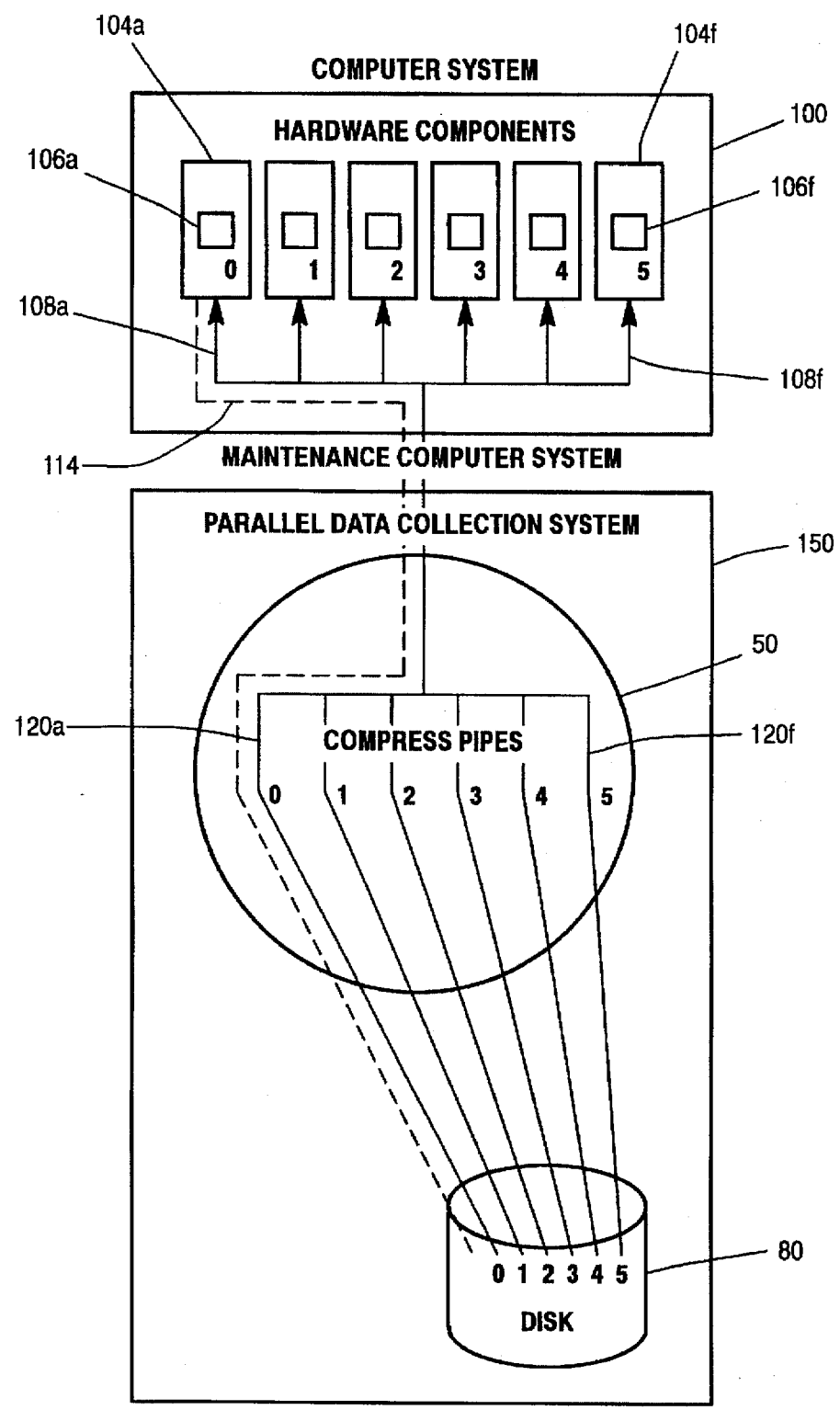
FIG. 3 is a block diagram representation of a large computer system wherein the system for parallel collection of state dump information of FIG. 2 operating upon a maintenance computer may control a parallel state dump of information within the large computer with data compression.

Referring to the drawings, wherein the same reference numerals are used to designate the same elements throughout, there are shown in FIGS. 2 and 3, respectively, block diagram representations of a preferred embodiment of a parallel diagnostic data collection method 50 of the present invention operating upon a maintenance computer 150 and a large computer system 100 which may be monitored by the parallel diagnostic data collection method 50. The large computer system 100 includes a plurality of hardware elements 104a–f which may be independent hardware processors. A plurality of data transmission links 108a–f are also included within the large computer system 100. While the method of the present invention is believed to be most advantageously applied to computer systems ranging in size from medium to large it will be understood that it may operate upon any computer system having a plurality of hardware elements 104a–f which in the preferred embodiment are processors.

The data transmission links 108a–f are respectively coupled to the hardware elements 104a–f and to the parallel diagnostic data collection method 50 and may be used for transmitting data from the hardware elements 104a–f to the diagnostic data collection method 50. The collection and transmission of data from the hardware elements 104a–f are performed under the control of a plurality of maintenance hardware modules 106a–f which are disposed within or connected to the respective elements 104a–f. The parallel diagnostic data collection method 50 of the present invention may be used to collect state dump information from within the hardware elements 104a–f of the large computer system 100 for diagnostic purposes at a later time.

Diagnostic information is collected from the large computer system 100 by the data collection method 50 when the data collection brings the computer system 100 down due to a system error. When this happens in the method of the present invention all hardware elements 104a–f are instructed simultaneously to begin collecting information relevant to their state at the time of the system error by the diagnostic data collection method 50 which is executed on the maintenance computer 150 while the computer system 100 is in operation. While the instruction for simultaneously collecting diagnostic information by the hardware elements 104a–f is provided by the maintenance computer 150 in the preferred embodiment of the invention, it will be understood that this instruction to the hardware elements 104a–f may be provided by the monitored computer system 100 itself or by any other source within the meaning and the scope of the present invention.

Thus the hardware elements 104a–f of the computer system 100 simultaneously perform the internal process of collecting their own dump data. When the diagnostic information is collected and dumped by the elements 104a–f and collected from the computer system 100 by the data collection method 50 it is compressed by the diagnostic data collection method 50 and stored. The stored information may then be used at a later time to reconstruct the state of the computer system 100 at the time of the system error and perform diagnostics to determine why the error within the large computer system 100 occurred.

The parallel diagnostic data collection method 50 evaluates the configuration of the computer system 100 to be dumped as shown in block 58. This configuration evaluation includes a determination of how many hardware elements 104a–f must be dumped. It will be understood that large computer systems of the type which may be monitored by the diagnostic data collection method 50 may have any number of hardware processors such as the hardware elements 104a–f. However, computer systems of this type typically contain between two and six hardware elements 104a–f.

Based upon the configuration evaluation performed in block 58, a determination is made whether state dump information can be collected from the computer system 100 in parallel as shown in decision block 62. If the data cannot be collected in parallel, data collection proceeds in accordance with the prior art serial state dump collection system 10, as previously described. In the serial state dump collection system 10 each of the hardware elements 104a–f dumps its state information in turn in accordance with conventional diagnostic data collection methods and the serial information is stored on the storage disc 20.

If data for the computer system 100 being monitored by the parallel diagnostic data collection method 50 can be collected in accordance with the method of the present invention, as determined in decision block 62, the data collection method 50 sends a dump state request to the maintenance hardware modules 106a–f of all hardware elements 104a–f in the computer system 100 simultaneously. The simultaneous instruction of all maintenance hardware modules 106a–f is shown in block 70. Thus, all maintenance hardware modules 106a–f in the computer system 100 begin performing operations required to collect and dump the diagnostic data of their hardware elements 104a–f at the same time and perform these operations in parallel with each other.

After all the maintenance hardware modules 106a–f are instructed to collect their state information at the same time by the diagnostic data collection method 50, it will be understood that differing maintenance hardware modules 106a–f may take differing amounts of time to perform the required operations. Thus, the parallel data collection method 50 waits as shown in block 72 for dump information to be available from the first hardware element 104a–f which has the information available. When data from the first hardware element 104a–f is available, a signal is provided and the information is collected by the data collection method 50 from the first hardware elements 104a–f which is done by way of its data transmission link 108a–f. The collected information is compressed and written to the storage disc 80 of the maintenance computer 150 by the parallel diagnostic data collection method 50 as shown in block 76.

Compression of the diagnostic data dumped by the elements 104a–f of the computer system 100 is performed by compression pipelines 120a–f within the parallel data collection method 50. The individual compression pipelines 120a–f correspond to the hardware elements 104a–f in a manner understood by those skilled in the art. Thus, for example, when the hardware element 104a dumps its state information, the information is transmitted by way of the data transmission link 108a to the data collection system 150 where it is compressed by compression pipeline 120a. This illustrative sequence of events under the control of the data collection method 50 is indicated by the dashed line 114 of FIG. 3.

In an alternate embodiment of the data collection method 50 (not shown), wherein only one hardware elements 104a-f is provided, only a single compression pipeline 120a-f is required. In this case the state dump data of the single elements 104a-f can be compressed by the single compressor pipeline 120a-f.

Although the state dump information collected is compressed in block 76 before being sent to the storage disc 80 in the preferred embodiment of the parallel diagnostic data collection method 50, it will be understood that the information collected may be applied to the storage disc 80 either with or without compression within the scope of the present invention. However, the required capacity of the storage disc 80 is increased and the time required for accessing the storage disc 80 is increased if the diagnostic dump information is not compressed by the compress pipelines 108a-f within the data collection method 50 prior to storage.

Additionally, it will be understood that if the state dump information is compressed prior to being applied to the storage disc 80, any conventional method of data compression may be used within the data collection method 50 of the present invention provided it is effective to permit reconstruction of the compressed data for diagnostic purposes at a later time. One method of data compression which may be used for this purpose within the parallel diagnostic data collection method 50 is taught in U.S. Pat. No. 4,558,302, "High Speed Data Compression and Decompression Apparatus and Method," issued to Welch on Dec. 10, 1985, which is incorporated by reference herein.

In method 50, compression of data is done "on-the-fly." In this method as data is available it is read from the hardware elements 104a-f and compressed and written to the disk 80. An alternative approach is to read data from the hardware elements 104a-f and write the data directly to the disk 80 without compression. When all the data has been read from the hardware elements 104a-f, the data on the disk 80 may be compressed to produce a new compressed file.

The compression of data prior to storage on the disk 80 is superior to this alternative because when data is compressed "on-the-fly," the read/write time of the disk 80 is greatly reduced. For example, if two megabytes of state information are available the disk I/O penalty for not compressing on-the-fly may be estimated as follows. Assuming that the two megatypes of data is compressed eighty percent and the resulting in data is four hundred kilobytes the disk I/O time is the time required to write four hundred kilobytes using on-the-fly compression. If compression is performed after all the data is gathered the disk I/O time is the time required to write the two uncompressed megabytes plus the time required to read the two megabytes from the disk 80 in order to compress it, plus the time required to write the four hundred kilobytes of compressed data.

When the dumped diagnostic information has been written to the storage disc 80 within the data collection method 50, a determination is made whether state dump information has been received from all hardware elements 104a-f in the computer system 100. This determination is made as shown in decision block 84. If information must still be collected from some hardware elements 104a-f at this point execution of the parallel diagnostic data compression method 50 returns to block 72.

In block 72 the data collection method 50 waits for the next maintenance hardware module 106a-f to complete collection of diagnostic information within its hardware elements 104a-f. When the dump information of all hardware elements 104a-f has been received, as determined in decision block 84, execution of the parallel diagnostic data collection method 50 ends as shown in terminal block 28.

Figure 4:
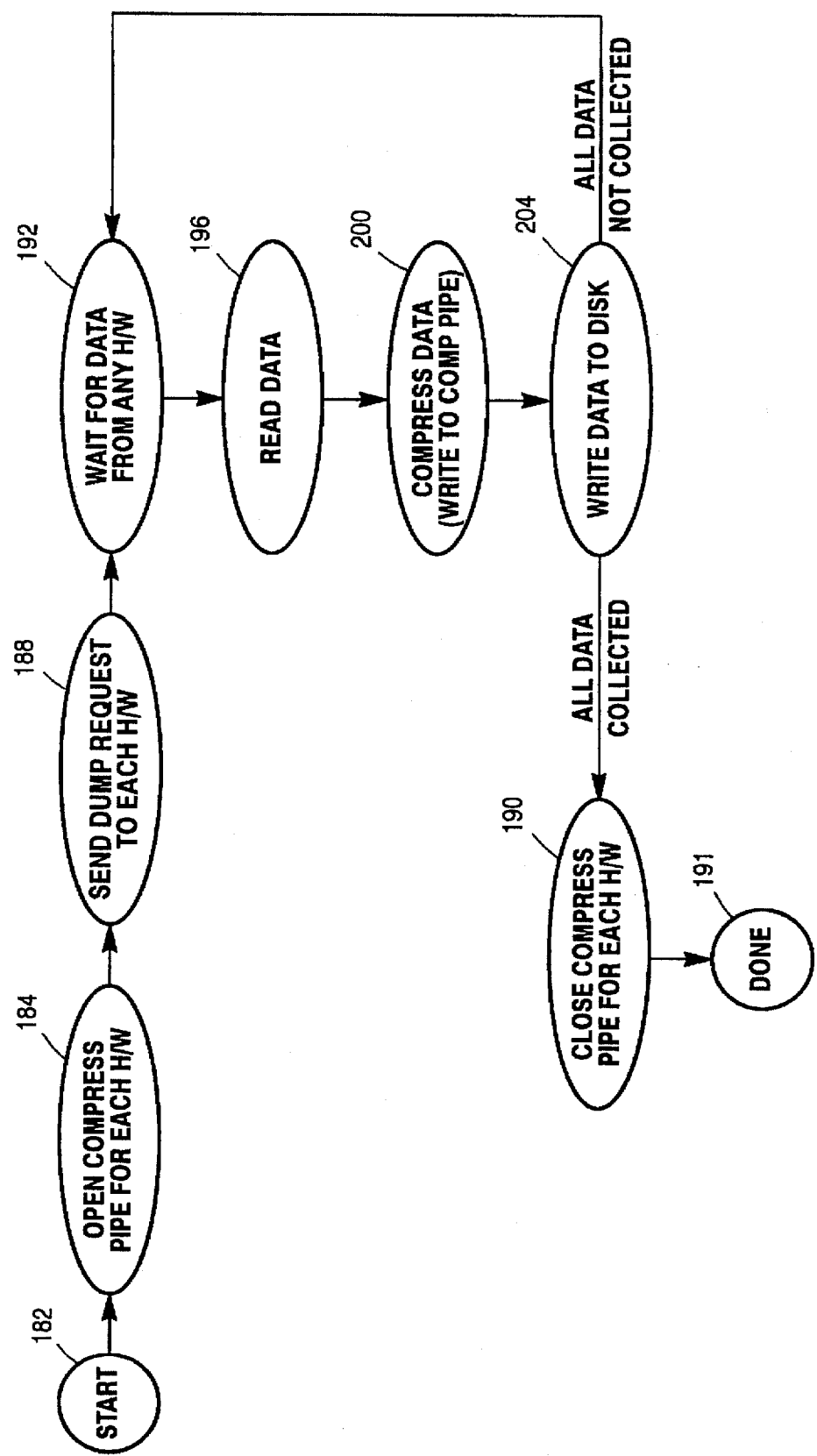
FIG. 4 is a state diagram representation of the system for parallel collection of state dump information of FIG. 2 with a compression process.

Referring to FIG. 4, there is shown a parallel dump process state diagram 180. The parallel dump process state diagram 180 further illustrates the parallel collection of diagnostic information from the large computer system 100 and the compression of the collected information which are performed by the parallel diagnostic data collection method 50 of the present invention. The operations illustrated in the dump process state diagram 180 may also be performed within the maintenance computer 150.

With reference to start terminal 182 of the state diagram 180, the first state illustrated is state 184 wherein the diagnostic data collection method 50 opens the compress pipelines 120a-f. This permits the compress pipelines 120a-f to compress diagnostic data received from the large computer system 100 prior to storage of the diagnostic data on the storage disc 80. The next state of the dump process state diagram 180 is state 188. In state 188 the diagnostic data collection method 50 simultaneously sends a dump request to each hardware maintenance module 106a-f of the hardware elements 104a-f within the computer system 100. It will be understood that references to simultaneous instruction of the hardware maintenance modules 106a-f herein are intended to include sequential instruction of the modules 106a-f over a substantially small amount of time where system architecture is not suitable for the strictly simultaneous type of instruction which may occur in hardware suitable for, for example, broadcast instructions. This is the request which initiates the simultaneous collection of diagnostic data by all of the hardware maintenance modules 106a-f within the large computer system 100.

The data collection method 50 of the present invention enters state 192 from state 188. In state 192 the data collection method 50 waits for data from the next hardware elements 104a-f to complete its collection of diagnostic dump information in response to the requests issued while the data collection method 50 was in state 188.

During the time that the data collection method 50 waits in state 192 the elements 104a-f which have not completed their dump are simultaneously collecting their diagnostic information in preparation for transmission of the information to the data collection method 50. When dump information is received from the next hardware elements 104a-f by way of its data transmission link 108a-f the state of data collection method 50 changes from state 192 to state 196. In state 196 the dump information from the next hardware elements 104a-f is read by the data collection method 50.

After the newly available diagnostic data is read by the data collection method 50 state 200 is entered. In state 200 the data which is read while in state 196 is compressed using the compress pipeline 120a-f corresponding to the dumping hardware element 104a-f. The compressed diagnostic data is written to the storage disc 80 in state 204. From state 204 the data collection method 50 may enter state 192 and wait for further data from the next hardware element 104a-f which is ready for data collection. Alternately, if all the data has been collected the data collection method 50 proceeds to terminal state 190. When all the compression pipelines 120a-f are closed method 50 proceeds to state 191.

It will be appreciated by those skilled in the art that changes could be made to the embodiment described above without departing from the broad inventive concept thereof. It is understood, therefore, that this invention is not limited to the particular embodiment disclosed, but it is intended to cover all modifications within the spirit and scope of the present invention as defined by the appended claims.

What is claimed is:

1. A method for rapidly collecting diagnostic information which defines the state of a computer system from a predetermined plurality of hardware elements located within said computer system, wherein each of said plurality of hardware elements is capable of preparing and storing diagnostic information which defines the state of said hardware element, comprising the steps of:

sensing a predetermined desired condition in said computer system at the time of said desired condition;

suspending operation of all said predetermined hardware elements;

simultaneously instructing all of said predetermined hardware elements to prepare and store their own diagnostic information;

simultaneous preparing and storing of said diagnostic information by each said instructed hardware element;

raising an indication by each said instructed hardware element when said instructed hardware element has completed said preparing and storing of diagnostic information;

collecting said diagnostic information from each of said instructed hardware elements after said hardware element raises its said indication;

transferring said diagnostic information over a transmission link to a mass storage medium for subsequent diagnostic analysis; and resuming operation of all said predetermined hardware elements.

2. The method as set forth in claim 1, further including the step of restarting said computer system following the collection of said diagnostic information.

3. The method as set forth in claim 1, further including the step of resuming operation of said computer system following the collection of said diagnostic information.

4. A method for collecting system diagnostic information from a plurality of hardware elements of a computer system in which the operation has been suspended as a result of error or other condition, wherein said system diagnostic information is collected for use to recreate the state of said system at the time of said error or condition, and wherein said hardware elements of said computer system include means for generating and storing said system diagnostic information for collection, said method comprising the steps of:

suspending system operation prior to collecting diagnostic information;

simultaneously instructing each of said hardware elements to prepare said diagnostic information relating to the state of said hardware element at the time of said error or predefined condition;

raising indications from each of said hardware elements that said system diagnostic information preparation has been completed for said hardware element;

transferring said system diagnostic information from each of said hardware elements as each of said hardware elements completes said preparation of system diagnostic information; and storing said system diagnostic information in a storage medium for subsequent diagnostic analysis.

5. The method as set forth in claim 4 which further includes the step of analyzing said stored system diagnostic information to determine the cause of said error or condition responsible for said suspension of the computer system operation.

6. The method as set forth in claim 5, wherein said step of analyzing is performed off-line, after said computer system has resumed operation.

7. The method as set forth in claim 4, which further includes the step of compressing said system diagnostic information for storage in said storage medium.

8. The method as set forth in claim 4, wherein said computer system is equipped with a separate maintenance system for monitoring said computer system for errors or other conditions, and transferring said system diagnostic information from said hardware elements when one of said errors or conditions occurs.

9. The method as set forth in claim 4, wherein the transferring of state diagnostic information is controlled by one or more of the said hardware elements of the computer system.

* * * * *